United States Patent [19]

White

[11] 3,780,597
[45] Dec. 25, 1973

[54] PUSHBUTTON SHIFT MECHANISM
[75] Inventor: Robert L. White, Frankenmuth, Mich.
[73] Assignee: General Motors Corporation, Detroit, Mich.
[22] Filed: Oct. 13, 1972
[21] Appl. No.: 297,302

[52] U.S. Cl............................ 74/483 PM, 74/10.33
[51] Int. Cl............................................. G05g 13/02
[58] Field of Search...................... 74/483 PB, 10.33, 74/10.29, 10.37; 200/5 E

[56] References Cited
UNITED STATES PATENTS
| | | | |
|---|---|---|---|
| 2,933,948 | 4/1960 | Thompson | 74/483 PB |
| 2,295,966 | 9/1942 | Plensler | 74/10.37 |
| 3,699,817 | 10/1972 | Nilssen | 74/10.37 |
| 2,260,429 | 10/1941 | Barrett | 74/10.37 |

Primary Examiner—Allan D. Herrmann
Attorney—Warren E. Finken et al.

[57] ABSTRACT

The drawings illustrate a pushbutton transmission shift mechanism including pushbutton members each having an inner abutment face formed thereon, a contoured member having a plurality of flat surfaces formed thereon at equal angles with respect to each adjacent flat surface and directly aligned with the respective inner abutment faces for being selectively pivotted thereby to a face-to-face relationship therewith upon selective depression of respective pushbuttons, a lever formed on an end portion of the contoured member, and a transmission selector cable connected to the lever for actuating selective transmission drive ratios.

7 Claims, 5 Drawing Figures

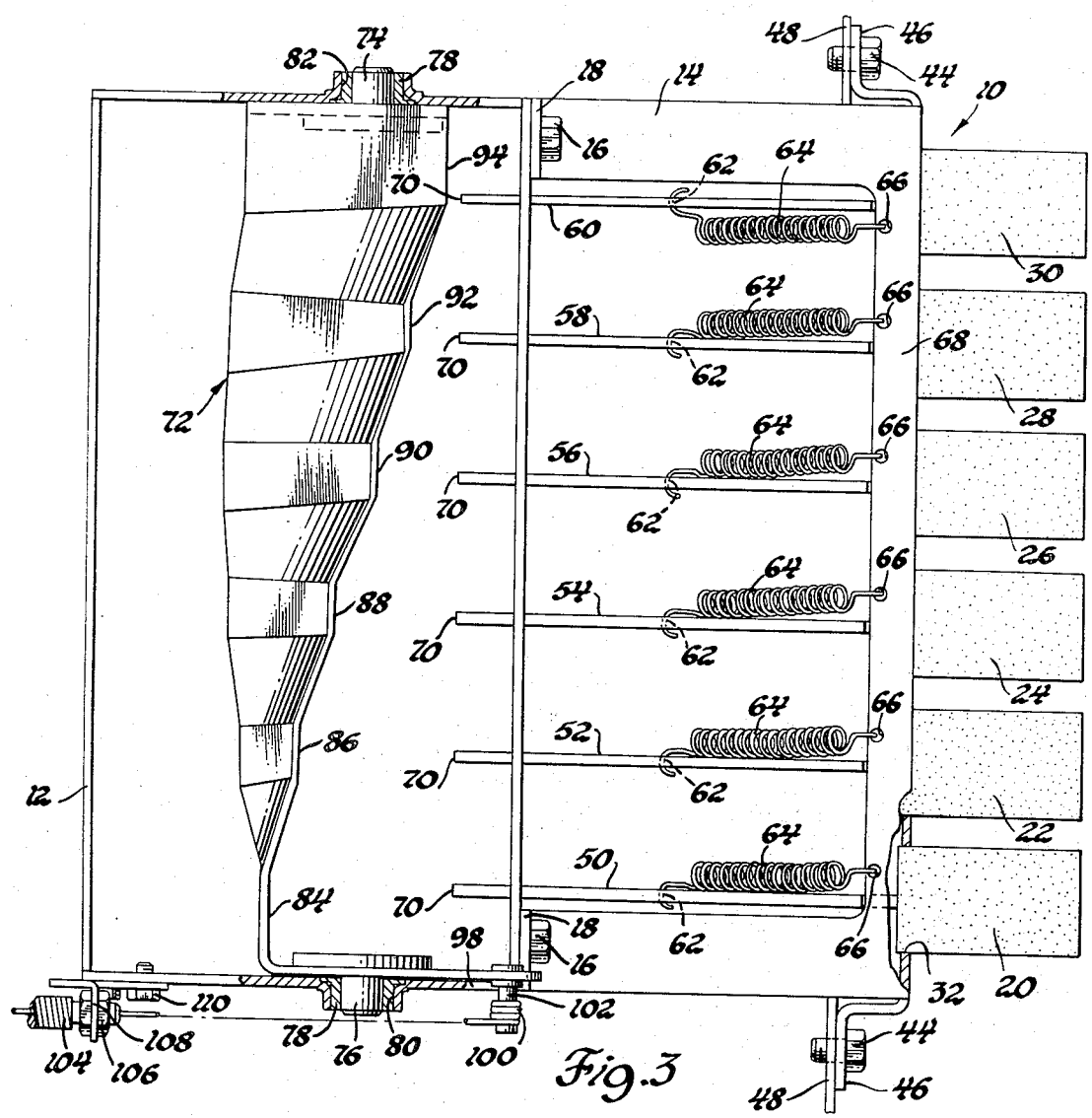
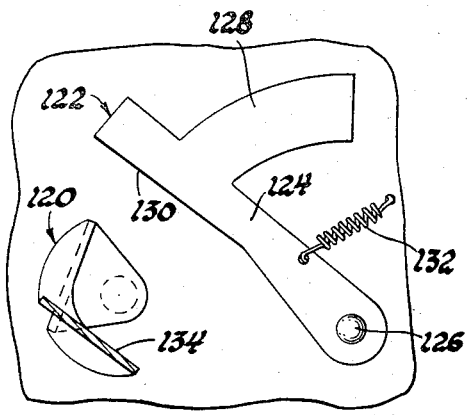
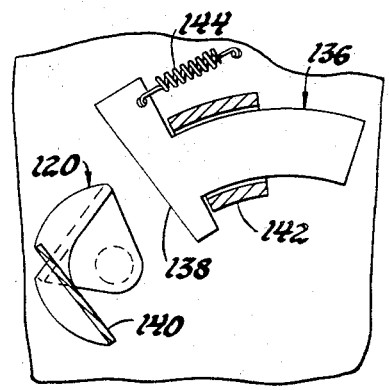
Fig. 3
Fig. 4
Fig. 5

PUSHBUTTON SHIFT MECHANISM

This invention relates generally to vehicular transmission shift mechanisms and, more particularly, to pushbutton-type shift mechanisms.

For particular vehicular models it is sometimes desirable to utilize an instrument panel-mounted pushbutton transmission shift mechanism, provided such a mechanism is economical and accurately dependable in operation for all shift ratios.

Accordingly, an object of the invention is to provide an improved pushbutton shift mechanism which satisfies the abovedescribed requirements.

Another object of the invention is to provide an improved pushbutton shift mechanism wherein a cable operatively connected to an automotive transmission is readily moved to a desired ratio selecting position by mechanical means including a cable-actuating contoured member having a series of abutment surfaces formed thereon and progressively varying in slope so as to be separately rotated to a predetermined ratio selecting attitude by the selective manual depression of adjacent pushbuttons.

A further object of the invention is to provide a pushbutton shift mechanism including a plurality of similarly shaped pushbutton actuator members, a pivotable member whose axis transversely intercepts the axes of all the pushbutton actuator members, a series of spaced flats formed at progressively stepped equal angles along the pivotable member and respectively aligned with the adjacent inner ends of the pushbutton actuator members for being pivotally actuated thereby to selectively position an associated transmission ratio selector cable.

These and other objects and advantages of the invention will be apparent when reference is made to the following description and accompanying drawings, wherein:

FIG. 3 is a top view of the invention, taken along the plane of line 3—3 of FIG. 2, and looking in the direction of the arrows; and FIGS. 4 and 5 are fragmentary side views of alternate embodiments of the invention.

Figure 1:
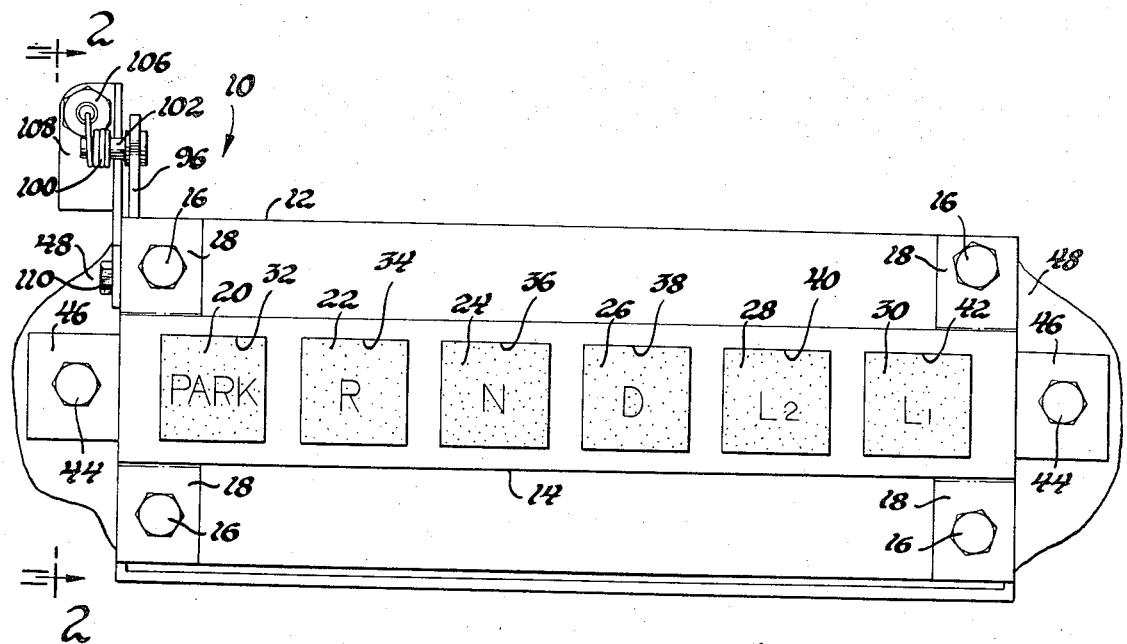
FIG. 1 is a plan view of an instrument panel-mounted pushbutton shift mechanism embodying the invention.

Referring now to the drawings in greater detail, FIG. 1 illustrates a pushbutton shift mechanism 10 including a housing 12 having a guide compartment 14 secured to a vertical face thereof by bolts 16 mounted through flanges or brackets 18 formed on the guide compartment 14. A plurality of pushbuttons 20, 22, 24, 26, 28, and 30 extend through respective substantially square-shaped openings 32, 34, 46, 48, 40 and 42 formed in the guide compartment 14. The guide compartment 14 is secured by bolts 44 mounted through brackets 46 formed on opposite sides of the compartment 14 to the instrument panel, represented at 48.

As illustrated in FIG. 3, a plurality of vertically positioned actuator arms 50, 52, 54, 56, 58, and 60 are secured to the inner ends of the respective pushbuttons 20, 22, 24, 26, 28, and 30, and are slidably mounted in the guide compartment 14. Each actuator arm has a small opening 62 formed at an intermediate point therealong. Respective ends of similar springs 64 are mounted in the openings 62, while the other ends of the springs 64 are connected to respective small openings 66 formed on an upper surface or ledge 68 of the guide compartment 14. An abutment member 70 (FIG. 2) is formed on the inner end of each actuator arm 50, 52, 54, 56, 58, and 60.

Figure 2:
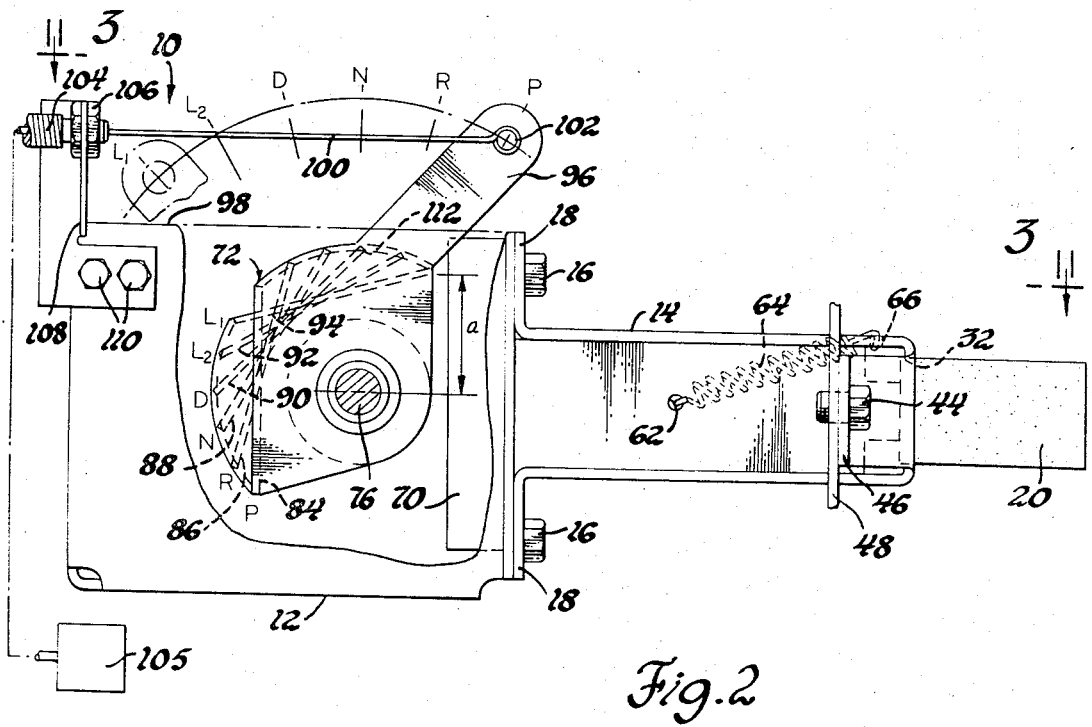
FIG. 2 is a side view of the invention, taken along the plane of line 2—2 of FIG. 1, and looking in the direction of the arrows, with a portion thereof broken away.

A member 72 formed from sheet material so as to have a contoured configuration, is mounted for rotary movement within the housing 12 by virtue of pivot pins 74 and 76 formed on opposite ends of the member 72 being rotatably mounted on bearings 78 in respective openings 80 and 82 formed in opposite side walls of the housing 12. The contoured member 72 is formed so as to include a plurality of equally spaced flat surfaces 84, 86, 88, 90, 92, and 94, the planes of which are respectively positioned directly in line with the respective oppositely disposed abutment members 70 of the actuator arms 50, 52, 54, 56, 58, and 60 (FIG. 3). The planes of the respective flat surfaces 84, 86, 88, 90, 92, and 94 are located on the member 72 so as to be at progressively stepped equal angular relationship with each adjacent flat surface plane, as illustrated in FIG. 2, thereby varying in equal angular increments with respect to their respectively aligned abutment members 70.

A cable-actuating arm 96 is formed on one end of the member 72, extending beyond the upper surface 98 of the housing 12. A cable 100 is secured at one end thereof to a pin 102 mounted adjacent the end of the arm 96. The cable 100 extends therefrom through a sheath 104 to the transmission, the latter being generally represented at 105 in FIG. 2, to selectively actuate the various drive ratios thereof. The sheath 104 is secured by a nut 106 to a bracket 108 by bolts 110 on an end portion of the housing 12.

As may be noted by referring to FIG. 1, the usual shift ratio indicia, "PARK," "R," "N," "D," "L₂," and "L₁" are formed or etched on the outer end faces of the respective pushbuttons 20, 22, 24, 26, 28, and 30. The "PARK," "R," "N," "D," "L₂," and "L₁" buttons being secured to the respective actuator arms 50, 52, 54, 56, 58, and 60, are thus operative through the abutment members 70 to selectively rotate the member 72 by first contacting and then pivotting the respective oppositely disposed flat surfaces 84, 86, 88, 90, 92, and 94 into the vertical attitude illustrated in FIG. 2 for the PARK flat surface 84, the vertical attitude resulting from the final face-to-face contact between the surfaces 84 and 70.

It may be realized that, as any other of the pushbuttons is thereafter manually depressed, "D," for example, the member 72 is caused to rotate in a counter-clockwise direction by virtue of the abutment member 70 on the end of the actuator arm 56 contacting first the upper corner 112 (FIG. 2) of the flat surface 90 and pushing thereon until the surface 90 will have attained the above-described vertical attitude illustrated for the surface 84. The arm 96 correspondingly rotates with the member 72 to the "D" arcuate position shown in FIG. 2, moving the cable 100 as required to produce the desired forward drive ratio in the transmission 105.

Once any pushbutton is released, its respective spring 64 will return it to its outermost position, as shown in FIG. 3.

FIG. 4 illustrates an alternate embodiment of the invention wherein a contoured member 120, similar in design to the member 72, is selectively rotated to desired ratio selector positions by a plurality of similar pivotally mounted pushbutton actuator members 122, there being only one illustrated in FIG. 4. Each actuator member 122 includes an arm 124 pivotally mounted at one end thereof on a fixed pivot pin 126. An arcuate-shaped push-button 128 is formed on a side of each arm 124 adjacent the other end thereof, substantially midway with respect to a flat surface 130 formed on the opposite side of each arm 124. The flat surface 130 of each member 122 is selectively rotated about the pivot pin 126 by manually depressing the pushbutton 128, against the force of a return spring 132, until the flat surface 130 has rotated the contoured member 120 to coincide with an aligned flat surface 134 formed on the latter member 120. There are a series of flat surfaces 134 corresponding to the surfaces 84, 86, 88, 90, 92, and 94 of the member 72 (FIG. 2).

The FIG. 5 arrangement is similar to the FIG. 4 arrangement, the FIG. 5 structure including the contoured member 120 and a plurality of arcuate-shaped pushbutton actuator members 136, all similar to the one shown and each having a flat abutment portion 138 formed on the inner end thereof adjacent one of a series of flat surfaces 140 formed on the contoured member 120 comparable to the surfaces 84, 86, 88, 90, 92, and 94 of FIG. 2. Each member 136 is slidably mounted in an arcuate-shaped guide member 142. A spring 144 serves to return each pushbutton actuator member 136 to its original position after being manually released.

It should be apparent that the invention provides an improved mechanical pushbutton shift mechanism wherein all the pushbutton actuator members are the same in structure, except for the ratio selector indicia identification thereon, and each cooperates with an adjacent transversely positioned contoured member to rotate the latter to accurately and efficiently position a transmission shift selector cable operatively connected to the contoured member.

While three embodiments of the invention have been shown and described, other modifications thereof are possible.

I claim:

1. A pushbutton shift mechanism comprising a housing, a plurality of pushbutton members extending from and movably mounted in said housing, co-planar actuator-end faces formed on the inner ends of said pushbutton members, a return spring connected between a wall portion of said housing and each of said pushbutton members, a contoured member having pivot pins formed on oppositely disposed ends thereof, said pivot pins being pivotally mounted in openings formed in oppositely disposed side walls of said housing and having the axis thereof transversely disposed across and spaced a predetermined distance apart from said co-planar actuator-end faces, said contoured member being shaped so as to have a plurality of flat surfaces integrally formed thereon, each of said flat surfaces being formed at a predetermined angle with respect to each adjacent flat surface and respective flat surfaces being spaced apart from and aligned directly opposite said respective actuator-end faces, and a transmission ratio selector cable connector member integrally formed on an end portion of said contoured member, said connector member being pivotable to selected drive ratio positions in response to manual depression of said respective pushbutton members, causing said actuator-end face thereof to contact and rotate said oppositely disposed flat surface until said respective actuator-end face and said aligned flat surface attain a face-to-face relationship.

2. A pushbutton shift mechanism comprising a housing, a plurality of pushbutton members extending from and slidably mounted in said housing, co-planar actuator-end faces formed on the inner ends of said pushbutton members, a return spring connected between a wall portion of said housing and each of said pushbutton members, a contoured member having pivot pins formed on oppositely disposed ends thereof, said pivot pins being pivotally mounted in openings formed in oppositely disposed side walls of said housing and having the axis thereof transversely disposed across and spaced a predetermined distance apart from said co-planar actuator-end faces, said contoured member being formed from sheet material to include a plurality of flat surfaces integrally formed thereon, each of said flat surfaces being formed at a predetermined angle with respect to each adjacent flat surface and respective flat surfaces being spaced apart from and directly opposite said respective actuator-end faces, and a transmission ratio selector cable connector member integrally formed on an end portion of said contoured member, said connector member being pivotable to selected drive ratio positions in response to manual depression of said respective pushbutton members, causing said actuator-end face thereof to contact and rotate said oppositely disposed flat surface until said respective actuator-end face and said flat surface attain a face-to-face relationship.

3. A pushbutton shift mechanism comprising a housing, a plurality of arcuate-shaped pushbutton members extending from and pivotally mounted in said housing, co-planar actuator-end faces formed on the inner ends of said pushbutton members, a return spring connected between a wall portion of said housing and each of said pushbutton members, a contoured member having pivot pins formed on oppositely disposed ends thereof, said pivot pins being pivotally mounted in openings formed in oppositely disposed side walls of said housing and having the axis thereof transversely disposed across and spaced a predetermined distance apart from said co-planar actuator-end faces, said contoured member being shaped so as to have a plurality of flat surfaces integrally formed thereon, each of said flat surfaces being formed at a predetermined angle with respect to each adjacent flat surface and respective flat surfaces being spaced apart from and positioned directly opposite said respective actuator-end faces, and a transmission ratio selector cable connector member integrally formed on an end portion of said contoured member, said connector member being pivotable to selected drive ratio positions in response to manual depression of said respective arcuate-shaped pushbuttom members, causing said actuator-end face thereof to contact and rotate said oppositely disposed flat surface until said respective actuator-end face and said positioned flat surface attain a face-to-face relationship.

4. A pushbutton shift mechanism comprising a housing, a plurality of lever arms individually pivotally mounted in said housing, a pushbutton formed on a side of each of said lever arms and extending through frontal openings formed in said housing, a flat-surfaced abutment face formed on the opposite side of each of said lever arms, a return spring connected between said housing and each of said lever arms, a contoured member having pivot pins formed on oppositely disposed ends thereof, said pivot pins being pivotally mounted in openings formed in oppositely disposed side walls of said housing and having the axis thereof transversely disposed relative to the axes of said pushbuttons, said contoured member being shaped so as to have a flat surface integrally formed thereon adjacent each of said flat-surfaced abutment faces, said flat surfaces being formed at equal angles with respect to each adjacent flat surface and being directly oppositely disposed from said flat-surfaced abutment faces for being selectively pivoted thereby about said pivot pins, an arm integrally formed on an end portion of said contoured member and extending beyond a predetermined wall of said housing, and a transmission ratio selector cable connected at one end thereof to the extended end of said arm.

5. A transmission shift mechanism comprising a housing having a plurality of arcuate-shaped guide passages formed therein, an arcuate-shaped pushbutton extending from an end of each of said guide passages and slidably mounted therein, a flat-surfaced abutment member formed on the inner end of each pushbutton adjacent the other end of each of said guide passages, a spring connected between a frontal wall portion of said housing and each of said abutment members urging the back side of each of said abutment members against said other end of each of said respective guide passages and limiting the fully extended positions of each of said pushbuttons, a contoured member having pivot pins formed on oppositely disposed ends thereof, said pivot pins being pivotally mounted in openings formed in oppositely disposed side wall portions of said housing and having the axis thereof transversely disposed relative to the axes of said pushbuttons, said contoured member being shaped so as to have a flat surface integrally formed thereon adjacent each of said abutment members, said flat surfaces being formed at equal angles with respect to each adjacent flat surface and being aligned with said respective abutment members for being selectively pivoted thereby about said pivot pins, and an arm integrally formed on an end portion of said contoured member so as to extend beyond a predetermined wall of said housing and adapted to have a transmission ratio selector cable connected thereto.

6. A transmission shift mechanism comprising a housing having a narrow frontal chamber and a wider rear chamber, a common wall and fastener means therefor for securing said frontal and rear chambers together, a common opening formed in said common wall, a plurality of pushbuttons extending from openings formed in said frontal chamber, an actuator portion formed on the inner end of each pushbutton and slidably mounted in said frontal chamber and through said common opening, a flat-surfaced abutment member formed on the innermost end of each of said actuator portions and located in said rear chamber, a spring connected between a wall portion of said frontal chamber and each of said actuator portions urging each of said abutment members against said common wall between said chambers and limiting the fully extended positions of said pushbuttons, a contoured member having pivot pins formed on oppositely disposed ends thereof, said pivot pins being pivotally mounted in openings formed in oppositely disposed side walls of said rear chamber and having the axis thereof transversely disposed relative to the axes of said pushbuttons, said contoured member being shaped so as to have a flat surface integrally formed thereon adjacent each of said flat-surfaced abutment members, said flat surfaces being formed at equal angles with respect to each adjacent flat surface and being aligned with said respective flat-surfaced abutment members for being selectively pivoted thereby about said pivot pins, an arm integrally formed on an end portion of said contoured member so as to extend beyond a predetermined wall of said rear chamber and adapted to have a transmission ratio selector cable connected thereto.

7. A transmission shift mechanism comprising a housing having first and second sections thereof, fastener means for securing said first and second housing sections together, a common opening formed in said adjacent housing sections, a plurality of pushbuttons extending from frontal openings formed in said first housing section, an actuator formed on the inner end of each of said pushbuttons and slidably mounted in said first housing section and through said common opening, a flat-surfaced abutment member formed on the innermost end of each of said actuators and located in said second housing section, a spring connected between a wall portion of said first housing section and each of said actuators urging said respective abutment members against a wall portion of said second housing section immediately adjacent said first housing section, a contoured member having pivot pins formed on oppositely disposed ends thereof, said pivot pins being pivotally mounted in openings formed in oppositely disposed side walls of said second housing section and having the axis thereof transversely disposed relative to the axis of said pushbutton actuators, said contoured member being formed from sheet material to include a flat surface integrally formed thereon adjacent each of said flat-surfaced abutment members, each of said flat surfaces being formed at equal angles with respect to each adjacent flat surface and being directly oppositely disposed from said respective flat-surfaced abutment members for being selectively pivoted thereby about said pivot pins, and an arm integrally formed on an end portion of said contoured member and extending beyond a predetermined wall of said second housing section, and a transmission ratio selector cable connected at one end thereof to the extended end of said arm.

* * * * *

UNITED STATES PATENT OFFICE
CERTIFICATE OF CORRECTION

Patent No. 3,780,597            Dated December 25, 1973

Inventor(s) Robert L. White

It is certified that error appears in the above-identified patent and that said Letters Patent are hereby corrected as shown below:

Col. 1, line 54, change "46" to -- 36 --; and
change "48" to -- 38 --.

Col. 2, line 32, after "108" insert -- mounted --.

Signed and sealed this 30th day of July 1974.

(SEAL)
Attest:

McCOY M. GIBSON, JR.           C. MARSHALL DANN
Attesting Officer              Commissioner of Patents